Figure 1:
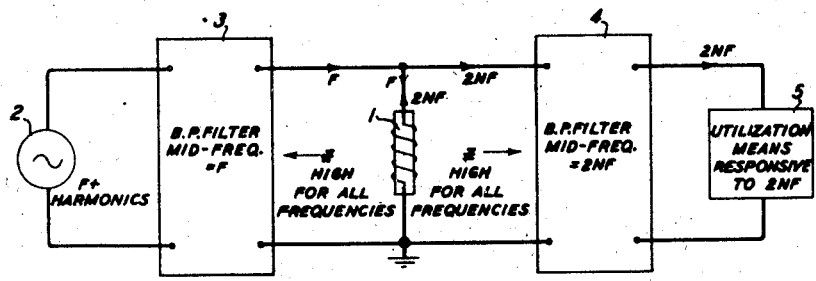

Sept. 2, 1947.  A. G. LAIRD ET AL  2,426,622
MAGNETIC FIELD DETECTOR
Filed Sept. 21, 1944  2 Sheets-Sheet 1

INVENTORS  A. G. LAIRD
T. SLONCZEWSKI
BY
Walter M. Hill
ATTORNEY

INVENTORS A. G. LAIRD
T. SLONCZEWSKI
BY
Walter M. Hill
ATTORNEY

Patented Sept. 2, 1947

2,426,622

UNITED STATES PATENT OFFICE 2,426,622

MAGNETIC FIELD DETECTOR

Arthur G. Laird, Summit, and Thaddeus Slonczewski, Glenwood Landing, N. J., assignors to Bell Telephone Laboratories, Incorporated, New York, N. Y., a corporation of New York Application September 21, 1944, Serial No. 555,058

7 Claims. (Cl. 177—380)

This invention relates to magnetic detection systems and more particularly to improvements in the exciting or driving circuits of magnetometer systems of the type employing a magnetometer comprising a core of magnetic material having windings thereon energized from a source of alternating current of fundamental frequency to generate even order harmonic voltages in the windings proportional in magnitude to the strength of the magnetic field to be measured. Such a system has been disclosed in the copending patent application of T. Slonczewski, Serial No. 483,756 filed April 20, 1943.

In the above-mentioned copending application the circuits were carefully designed to permit the magnetometer to be excited only by currents of fundamental frequency. The detection circuits were further designed to permit only a relatively small even order harmonic current to flow through the observing circuit from the magnetometer element. In an attempt to locate and eradicate spurious noise sources in these systems and also to improve the sensitivity thereof it was discovered that the sensitivity could be considerably increased by permitting the flow of generated odd-order harmonics through the magnetometer element. It was also discovered that the generated even-order harmonic currents flowing through the magnetometer were not detrimental and need not be eliminated. By permitting the odd-order harmonics to flow through the magnetometer elements the signal-to-noise ratio was materially increased without any sacrifice of the linear response relationship between field strength and the selected even-order harmonic output voltage.

It is the object of this invention to provide circuit means to permit the ready flow of odd-order harmonics through the magnetometer element but at the same time supplying the magnetometer with a pure sine wave source of alternating current of fundamental frequency, the circuits also permitting the detection of only one of the even-order harmonic voltages.

The foregoing object is attained by this invention by providing circuits comprising a source of alternating current of fundamental frequency, a magnetometer having at least one winding thereon, utilization means responsive to a preselected even-order harmonic generated by the magnetometer and filter means coupling the magnetometer windings to the source and to the utilization means, said filter means adapted to permit the passage of energizing current of fundamental frequency only from the alternating current source to the magnetometer, the passage of the preselected even-order harmonic current from the magnetometer to the utilization means and the ready circulation through the magnetometer of all other harmonic currents generated therein.

Figure 2:
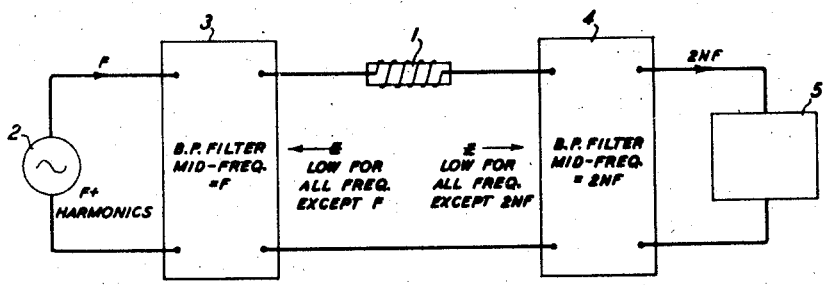
Figure 3:
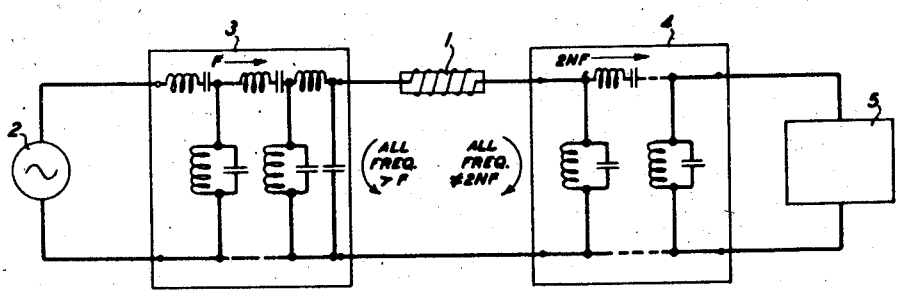
Figure 4A:
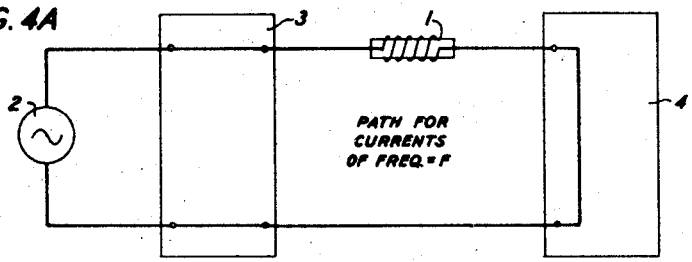
Figure 4B:
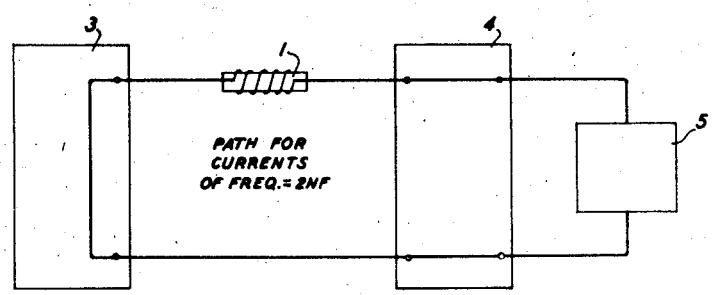
Figure 4C:
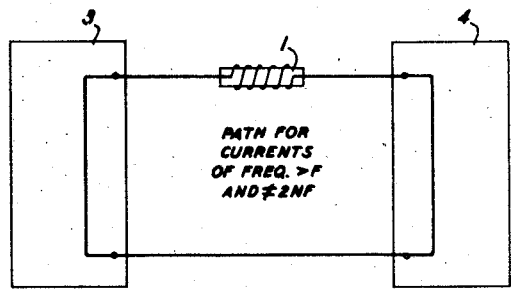
Figure 5:
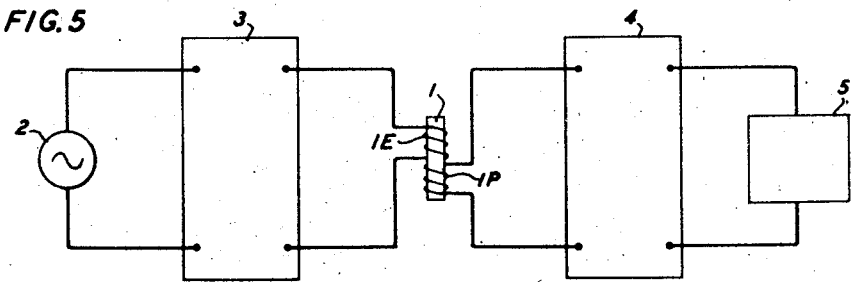

The invention may be better understood by referring to the accompanying drawings in which:

Fig. 1 discloses a magnetic detection system of the type applicable to this invention but energized in accordance with the disclosure in the aforesaid copending patent application;

Fig. 2 discloses an embodiment of the present invention;

Fig. 3 is similar to Fig. 2 but discloses in greater particularity a particular form of band-pass filter suitable for the practice of this invention;

Figs. 4A, 4B and 4C disclose the particular harmonic current paths taken by the harmonic current flowing in the circuits of Figs. 2 and 3; and Fig. 5 discloses a typical circuit using a magnetometer with more than one winding.

Referring now to Fig. 1, there is shown a magnetic detection system of the type more particularly disclosed in the above-mentioned copending patent application of T. Slonczewski. In this figure the magnetometer 1 may comprise a length of magnetic material having wound thereon one or more windings. Only one winding is shown on this figure since a description in relation thereto is adequate for a complete understanding of the present invention. With respect to a plurality of windings it is sufficient to say for the present that one of them may be used for exciting the magnetometer whereas one or more of the others may be employed for harmonic detection purposes, since the harmonics generated in the exciting winding are also generated in each of the other windings on the same core. This will be described in more detail in connection with Fig. 5.

The operation of this type of magnetometer element is based on the properties exhibited by magnetic material in a strong alternating magnetic field. The flux in an increasing magnetic field is proportional to the strength of the field only up to a certain critical value of field. Beyond that value the flux increases very slowly. If then a strong sinusoidal current is sent from a high impedance source through a coil with a magnetic core the flux in the core and therefore the voltage across the coil will not be sinusoidal. It will have frequency components which are harmonics of the driving frequency. In the absence of any exterior field this distortion will be symmetrical and will contain only odd harmonics of the driving frequency. If, however, a flux induced by a unidirectional magnetic field is also present, the even-order harmonics of the driving frequency will appear and their polarity will depend upon the direction of this flux. If the axis of the coil is maintained constantly in alignment with the earth's magnetic field, changes in that field caused by the presence of a mass of magnetic material will be indicated by changes in the strength of the even-order harmonics.

In Fig. 1 the magnetometer 1 is excited by an alternating current of fundamental frequency F coming from a source of alternating current 2. The source 2 may comprise not only the fundamental frequency F but a number of harmonics. It is a prime essential, however, that the magnetometer 1 be excited only with a sinusoidal source of fundamental frequency. Consequently, a band-pass filter 3 the mid-frequency of which is equal to the fundamental frequency F is inserted between the source 2 and the magnetometer 1. One of the even-order harmonic currents of frequency 2NF (N is equal to any arbitrary positive integer not equal to zero) is selected for detection by a band-pass filter 4 having its mid-frequency equal to the frequency 2NF. This current of selected frequency is passed through utilization means 5 which is responsive to this frequency. In the system just described it was considered important that only currents of fundamental frequency be permitted to pass through the exciting winding of magnetometer 1. For this reason the right end section of filter 3 presented to the magnetometer an impedance high for all frequencies, while the left end section of filter 4 also presented to the magnetometer 1 an impedance high for all frequencies. Obviously, the band-pass filter 3, however, would permit a ready flow of the current of fundamental frequency from the alternating current source 2 through the filter to the magnetometer 1. The source 2, however, was designed to have a fairly high impedance so that even for the fundamental frequency the filter 3 would present to the magnetometer a relatively high impedance.

As previously stated it has been discovered that a considerable improvement in sensitivity and in signal-to-noise ratio may be secured by permitting at least the odd-order harmonics to flow through the magnetometer energizing winding. These, of course, are harmonics which are generated by the magnetometer itself. Referring now to Fig. 2 it will be seen how the circuits of this invention are adapted to provide the ready circulation of harmonics generated by the magnetometer through its energizing winding.

In Fig. 2 the part corresponding to those in Fig. 1 bear the same reference numerals. It will be noted, however, that the magnetometer 1 instead of being connected in shunt across the path from the band-pass filter 3 to the band-pass filter 4, is connected in series with this path. It will also be noted that the right end section of filter 3 has been indicated as having a low impedance for all frequencies except the fundamental frequency F and that the left-hand end section of filter 4 presents a low impedance for all frequencies except the selected even-order harmonic frequency 2NF. With such a relationship of circuit elements it is obvious that there is established a substantial shunt around the magnetometer element 1 through the right end section of filter 3 and left end section of filter 4, this shunt being effective for currents of all frequencies except the fundamental frequency F and the selected even-order harmonic frequency 2NF. The currents of these latter frequencies flow through different paths. For example, the current of fundamental frequency F flows from the alternating current source 2 through the filter 3, magnetometer winding 1, the left end section of filter 4 and back to the alternating current supply source 2. On the other hand the current of selected even-order harmonic frequency 2NF flows from the magnetometer 1 through the right end section of filter 3 to the utilization means 5 and back to the magnetometer through band-pass filter 4. These paths will be more particularly described in connection with Fig. 4.

Fig. 3 is substantially identical with Fig. 2 except that the filters 3 and 4 are shown in greater detail. The particular circuit configurations for these filters should not be regarded as restrictive but only illustrative of filters which may be employed for this purpose. The principles of filter design are well understood and a number of filters of the band-pass type capable of being used in this invention are well known to the art. It will be noted in Fig. 3 that the right end section of filter 3 is of a type capable of passing all currents of frequencies greater than frequency F, while the currents of fundamental frequency F readily pass from the source 2 through the filter 3 and the magnetometer 1. It will also be noted that the left end section of filter 4 is adapted to pass all currents of frequencies not equal to the preselected even-order harmonic frequency 2NF. Consequently, the exciting currents of fundamental frequency F readily pass through this filter section and back to alternating current source 2. It will also be noted that the currents of the selected even-order harmonic frequency 2NF readily pass through filter 4 to the utilization means 5, and since this frequency is greater than the fundamental frequency F it will readily pass through the right end section of filter 3.

These harmonic frequency paths may be more easily understood by referring to Fig. 4 which is drawn in three parts 4A, 4B and 4C. Fig. 4A discloses schematically the path for the current of fundamental frequency F. It will here be noted that the current of this frequency comes from the alternating current source 2, passes readily through the band-pass filter 3, the mid-frequency of which is equal to the fundamental frequency F, through the energizing winding of magnetometer 1 and through the left end section of band-pass filter 4 back to the alternating current source 2.

In Fig. 4B the path for the current of the preselected even-order harmonic frequency 2NF is shown. It will here be noted that this current being generated in the winding of magnetometer 1 passes readily through the right end section of filter 3 through the band-pass filter 4, the mid-frequency of which is equal to this selected even-order harmonic frequency 2NF, and to the utilization means 5.

In Fig. 4C the path for the currents of frequencies greater than the fundamental frequency F but exclusive of the current of frequency equal to the preselected even-order harmonic frequency 2NF is shown. It will here be seen that this path is substantially a low impedance shunt path across the terminals of the energizing winding of magnetometer 1. This path starts from the magnetometer through the right end section of filter 3, the left end section of filter 4 and back to the magnetometer winding.

In Fig. 5 substantially the same circuits are shown as in Figs. 2 and 3 except that in this case the magnetometer 1 comprises two windings instead of only one winding. Winding 1E is employed for exciting the magnetometer with currents of fundamental frequencies from alternating current source 2. The pick-up winding IP is employed to pick up the preselected even-order harmonic frequency 2NF to be passed through filter 4 to utilization means 5. A fairly close coupling is preferably secured between windings IE and IP. The operation of this circuit is substantially identical with that already described for Figs. 2 and 3 and further description thereof is believed unnecessary. It need only be remembered that the circulating harmonic currents flow through the end sections of filters 3 and 4 by reason of the mutual inductance between the two windings. The effect electrically and magnetically upon the magnetometer is identical with that already described. It is obvious that additional pick-up windings such as IP may also be employed each one being connected to a separate filter, such as filter 4 and adapted to select a different one of the even-order harmonics. The only change required in the filter 4 is that the left end section must present a high impedance for each of the even-order harmonic voltages which is to be selected. Many filters capable of performing this function are well known in the art. One such filter would simply comprise a plurality of series-connected antiresonant elements of the same type shown in the left end section of filter 4 in Fig. 3.

What is claimed is:

1. In a magnetic detection system the circuits comprising a source of alternating current of fundamental frequency, a magnetometer having at least one winding thereon, utilization means responsive to preselected even-order harmonic voltage generated by the magnetometer, and filters coupling the magnetometer winding to the source and to the utilization means, said filters adapted to permit the passage of energizing current of fundamental frequency only from the alternating current source to the magnetometer, the passage of the preselected even-order harmonic current from the magnetometer to the utilization means and the ready circulation through the magnetometer of all other harmonic currents generated therein.

2. In a magnetic detection system the circuits comprising a source of alternating current of fundamental frequency, a magnetometer comprising a core of magnetic material having a winding thereon, utilization means responsive to a preselected even-order harmonic voltage generated by the magnetometer, and filters coupling the magnetometer winding to the source and to the utilization means, said filters adapted to permit the passage of energizing current of fundamental frequency only from the alternating current source to the magnetometer, the passage of the preselected even-order harmonic current from the magnetometer to the utilization means and the ready circulation through the magnetometer of all other harmonic currents generated therein.

3. In a magnetic detection system the circuits comprising a source of alternating current of fundamental frequency, a magnetometer comprising a core of magnetic material having at least one winding thereon, a filter connecting said source to said magnetometer and permitting the ready flow of energizing current of fundamental frequency from the source to the magnetometer, a second filter also connected to said magnetometer and to the first filter whereby said energizing current also flows through at least part of the second filter, said second filter permitting ready flow therethrough of current of a preselected even-order harmonic generated by the magnetometer, utilization means connected to said second filter and adapted to receive said preselected even-order harmonic current, and a shunt circuit path about said magnetometer including at least a part of each of said filters adapted to pass through the magnetometer harmonic circulating currents generated thereby.

4. In a magnetic detection system the circuits comprising a source of alternating current of fundamental frequency, a magnetometer comprising a core of magnetic material having at least one winding thereon, a filter connecting said source to said magnetometer and permitting the ready flow of energizing current of fundamental frequency from the source to the magnetometer, a second filter also connected to said magnetometer and to the first filter whereby said energizing current also flows through at least part of the second filter, said second filter permitting ready flow therethrough of current of a preselected even-order harmonic generated by the magnetometer, utilization means connected to said second filter adapted to receive said even-order harmonic current, and a shunt circuit path about said magnetometer including at least a part of each of said filters adapted to pass through the magnetometer harmonic circulating currents generated thereby, said circulating currents having frequencies greater than the fundamental frequency and including all other frequencies exclusive of the preselected oven-order harmonic frequency.

5. In a magnetic detection system the circuits comprising a source of alternating current of fundamental frequency, a magnetometer comprising a core of magnetic material having at least one winding thereon, utilization means responsive to preselected even-order harmonic voltage generated by the magnetometer, filter means coupling said source to a magnetometer winding and to the utilization means whereby only the current of fundamental frequency may pass from the source to the magnetometer and only current of the preselected even-order harmonics may pass from the magnetometer to the utilization means, and a shunt circuit path about the magnetometer for all currents of frequencies generated by said magnetometer other than said preselected even-order harmonic frequencies, said shunt path including at least a part of said filter means.

6. In a magnetic detector system the circuits comprising a source of alternating current of fundamental frequency, a magnetometer comprising a core of magnetic material having at least one winding thereon, utilization means responsive to a preselected even-order harmonic voltage generated by the magnetometer, filter means coupling said source to a magnetometer winding and to the utilization means whereby only the current of fundamental frequency may pass from the source to the magnetometer and only the current of the preselected even-order harmonic may pass from the magnetometer to the utilization means, and a shunt circuit path about the magnetometer for all currents of frequencies generated by said magnetometer other than the preselected even-order harmonic frequency, said shunt path including at least a part of said filter means.

7. In a magnetic detector system the circuits comprising a source of alternating current of fundamental frequency, a magnetometer comprising a core of magnetic material having at least one winding thereon, a band-pass filter having input and output terminals, the pass characteristics whereof permitting ready flow of current of fundamental frequency from its input to its output terminals, a second band-pass filter also having input and output terminals to pass characteristics whereof permitting ready flow of current of a preselected even-order harmonic of said fundamental frequency from its input to its output terminals, circuits connecting the source to the input terminals of the first band-pass filter and a magnetometer winding in series with the output terminals of the first filter and the input terminals of the second filter, a utilization means connected to the output terminals of the second filter, filter impedance means included between the output terminals of the first filter having a low impedance for currents of all frequencies greater than the fundamental frequency, and other filter impedance means included between the input terminals of the second filter having a low impedance for all currents of frequencies other than the said preselected even-order harmonic frequency whereby said filter impedance means provides a low impedance shunt path around said magnetometer for all harmonic currents generated by said magnetometer except those of frequency equal to the mid-frequencies of the band-pass characteristics of the filters.

ARTHUR G. LAIRD.
THADDEUS SLONCZEWSKI.